United States Patent
Gupta et al.

(10) Patent No.: US 12,372,005 B2
(45) Date of Patent: Jul. 29, 2025

(54) VARIABLE GEOMETRY TURBINE AND TURBOCHARGER WITH SAME

(71) Applicant: MITSUBISHI HEAVY INDUSTRIES ENGINE & TURBOCHARGER, LTD., Sagamihara (JP)

(72) Inventors: Bipin Gupta, Tokyo (JP); Takeru Chiba, Tokyo (JP); Hiroshi Nakagawa, Sagamihara (JP); Takashi Yoshimoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/728,180

(22) PCT Filed: Jan. 18, 2022

(86) PCT No.: PCT/JP2022/001572
§ 371 (c)(1),
(2) Date: Jul. 11, 2024

(87) PCT Pub. No.: WO2023/139639
PCT Pub. Date: Jul. 27, 2023

(65) Prior Publication Data
US 2025/0092797 A1 Mar. 20, 2025

(51) Int. Cl.
*F01D 17/16* (2006.01)
*F02B 37/24* (2006.01)

(52) U.S. Cl.
CPC .......... *F01D 17/16* (2013.01); *F01D 17/165* (2013.01); *F02B 37/24* (2013.01);
(Continued)

(58) Field of Classification Search
CPC ............................... F02B 37/22; F01D 17/165
See application file for complete search history.

(56) References Cited

U.S. PATENT DOCUMENTS 4,502,836 A * 3/1985 Swearingen .......... F01D 17/165
91/44
9,371,833 B2 6/2016 Martens et al.
(Continued)

FOREIGN PATENT DOCUMENTS

EP 1 674 668 A2 6/2006
JP 1-166726 U 11/1989
(Continued)

OTHER PUBLICATIONS

International Preliminary Report on Patentability and Written Opinion of the International Searching Authority for International Application No. PCT/JP2022/001572, dated Aug. 2, 2024, with an English translation.
(Continued)

*Primary Examiner* — Justin D Seabe
(74) *Attorney, Agent, or Firm* — Birch, Stewart, Kolasch & Birch, LLP

(57) ABSTRACT

Provided are a variable geometry turbine and a turbocharger with the same. The variable geometry turbine is provided with a turbine impeller, a housing, a plurality of nozzle vanes, and a link mechanism. Inside the housing, a link compartment in which the link mechanism is accommodated is formed, the link compartment being separated from a nozzle flow path by a hub-side member having a hub side surface defining the nozzle flow path. The link mechanism and each of the plurality of nozzle vanes are coupled together via a nozzle shaft penetrating through the hub-side member. The hub-side member has at least one communication hole providing communication between the nozzle flow path and the link compartment. When each of the plurality of nozzle vanes is fully opened, the opening of the at least one communication hole on the nozzle flow path side is formed on the inner side radially of the turbine impeller
(Continued)

than the leading edge of each of the plurality of nozzle vanes.

15 Claims, 11 Drawing Sheets

(52) U.S. Cl.
CPC .... *F05D 2220/40* (2013.01); *F05D 2240/128* (2013.01); *F05D 2260/60* (2013.01)

(56) References Cited

U.S. PATENT DOCUMENTS

| | | |
|---|---|---|
| 10,030,576 B2 * | 7/2018 | Ueda ................... F02B 37/24 |
| 11,946,377 B2 * | 4/2024 | Gupta ................. F01D 17/165 |
| 2014/0178181 A1 | 6/2014 | Tashiro et al. |
| 2018/0230851 A1 * | 8/2018 | Katou ................. F01D 17/165 |

FOREIGN PATENT DOCUMENTS

| JP | 11-350967 A | | 12/1999 |
|---|---|---|---|
| JP | 2006-177318 A | | 7/2006 |
| JP | 2009008013 A | * | 1/2009 |
| JP | 2013-72404 A | | 4/2013 |
| JP | 2013-96355 A | | 5/2013 |

OTHER PUBLICATIONS

International Search Report and Written Opinion of the International Searching Authority for International Application No. PCT/JP2022/001572, dated Apr. 5, 2022, with English translation.

* cited by examiner

VARIABLE GEOMETRY TURBINE AND TURBOCHARGER WITH SAME

TECHNICAL FIELD

The present disclosure relates to a variable geometry turbine including a plurality of nozzle vanes and a link mechanism that rotates each of the plurality of nozzle vanes, and a turbocharger including the variable geometry turbine.

BACKGROUND ART

A variable geometry turbocharger is used for an engine that requires a wide range of engine speeds to operate or a boost at low engine speeds. A variable geometry turbine, which is one of main components of a variable geometry turbocharger, is configured to include a scroll that schemes a scroll flow path through which exhaust gas discharged from an engine flows into a turbine, a nozzle assembly that controls a flow velocity and an incident angle at an inlet of a turbine rotor by means of nozzle vanes, the turbine rotor, and a diffuser that pushes the exhaust gas to the outside. In recent years, the application of a Miller cycle to a gasoline automobile engine has increased the demand for a variable geometry turbocharger not only for a conventional diesel automobile engine but also for a gasoline automobile engine.

However, in the variable geometry turbocharger, in order to enable the engine to operate in such a manner, the exhaust gas is heated or the number of movable components of the variable geometry turbine is increased, which is a significant problem in terms of reliability.

PTL 1 discloses an example of the invention related to above-described variable geometry turbocharger. The invention according to PTL 1 is to solve a problem in that, due to a pressure difference between a scroll flow path and a link compartment, unburned gas contained in an exhaust gas flowing through the scroll flow path leaks into the link compartment via a clearance between a nozzle vane and a nozzle mount or the like and is deposited on a movable component in the link compartment, and thus the deposited matter (deposits) obstructs movement of the movable component. Therefore, in the invention according to PTL 1, it is possible to reduce the leakage of the exhaust gas and to reduce the amount of the deposits that are deposited on the movable components by reducing the pressure difference between the scroll flow path and the link compartment by providing the nozzle mount with a through-hole that allows the exhaust gas to flow from the scroll flow path to the link compartment. Further, in PTL 1, the high-temperature exhaust gas flowing through the scroll passage flows into the link compartment, so that the heat of the exhaust gas acts to vaporize and dissipate the deposits adhering to and being deposited on the movable components, and thus it is disclosed that the movement of the movable components is maintained in a good state for a long period of time.

CITATION LIST

Patent Literature

[PTL 1] Japanese Unexamined Patent Application Publication No. 2013-96355

SUMMARY OF INVENTION

Technical Problem

However, since the nozzle vane is a movable member, a clearance is provided between a nozzle shaft penetrating the nozzle mount (hub-side member) and the nozzle mount, between the nozzle vane and the nozzle mount, and between the nozzle vane and a nozzle plate. Furthermore, the present inventors have found that in a case where an external force such as gravity or engine vibration is applied to the variable geometry turbine during the operation of the variable geometry turbine, the nozzle vane repeats an unnecessary movement in an extending direction (axial direction) of the nozzle shaft, and there is a possibility that the nozzle vane will be worn.

In view of the above-described problems, an object of at least one embodiment of the present invention is to provide a variable geometry turbine and a turbocharger with the same, in which the repetition of unnecessary movement of a nozzle vane can be suppressed and the progress of wear of the nozzle vane can be suppressed.

Solution to Problem

In order to achieve the above object, according to one aspect, there is provided a variable geometry turbine including a turbine impeller; a housing that accommodates the turbine impeller; a plurality of nozzle vanes that are disposed in a nozzle flow path formed inside the housing; and a link mechanism for rotating each of the plurality of nozzle vanes, in which a link compartment that accommodates the link mechanism and that is partitioned from the nozzle flow path by a hub-side member having a hub-side surface defining the nozzle flow path is formed inside the housing, the link mechanism and each of the plurality of nozzle vanes are connected to each other through a nozzle shaft penetrating the hub-side member, at least one communication hole through which the nozzle flow path and the link compartment communicate with each other is formed in the hub-side member, and an opening of the at least one communication hole on a nozzle flow path side is formed on an inner side in a radial direction with respect to a leading edge of each of the plurality of nozzle vanes in a case where each of the plurality of nozzle vanes is in a fully open state.

Advantageous Effects of Invention

According to an embodiment of the present disclosure, it is possible to provide a variable geometry turbine and a turbocharger with the same, in which an unnecessary movement of a nozzle vane can be suppressed and the progress of wear of the nozzle vane can be suppressed by increasing a pressure difference between a nozzle flow path and a link compartment and by increasing an axial force acting on the nozzle vane.

DESCRIPTION OF EMBODIMENTS

Figure 1:
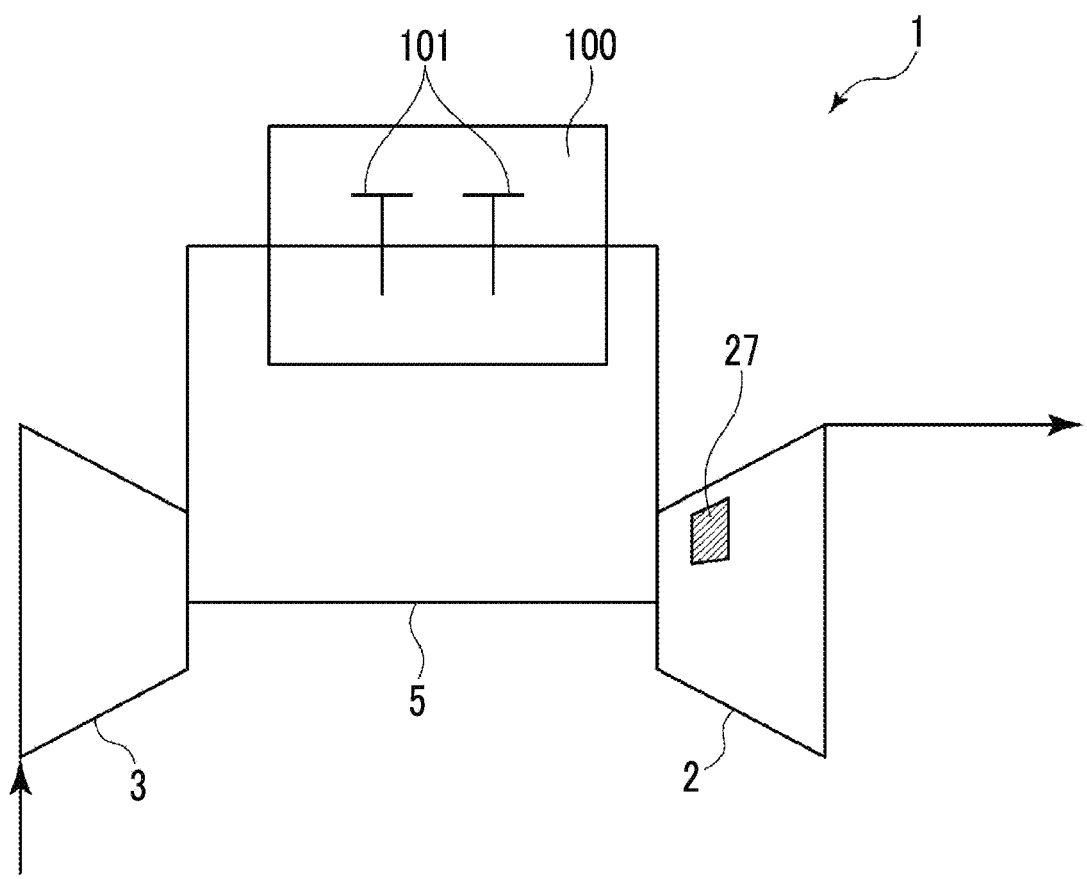
FIG. 1 is a schematic diagram showing a configuration of a turbocharger according to an embodiment.

Hereinafter, some embodiments of the present disclosure will be described with reference to the accompanying drawings. However, dimensions, materials, shapes, and relative dispositions of components described as the embodiments or illustrated in the drawings are not intended to limit the scope of the present disclosure, and are merely examples for describing the present disclosure.

For example, expressions representing relative or absolute dispositions such as "in a certain direction", "along a certain direction", "parallel", "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such quadrangular shape and a cylindrical shape in a geometrically strict sense, but also represent shapes including an uneven portion or a chamfered portion within a range where the same effect can be obtained.

Meanwhile, expressions of "being provided with", "including", or "having" one component are not exclusive expressions excluding existence of other components.

The same reference numerals may be assigned to the same configurations, and description thereof may be omitted.

(Overall Configuration of Turbocharger)

FIG. 1 is a schematic diagram showing a configuration of a turbocharger according to an embodiment.

As shown in FIG. 1, a turbocharger 1 includes a variable geometry turbine 2, a compressor 3, and a rotary shaft 5 (turbine shaft). The variable geometry turbine 2 is disposed on an exhaust side of an engine 100 including a piston 101 and a cylinder (not shown), and is rotationally driven by using exhaust energy from the engine 100. The variable geometry turbine 2 includes a nozzle vane 27 (to be described later) and is connected to one side end portion of the rotary shaft 5. The compressor 3 is disposed on an intake side of the engine 100 and is connected to the other end portion of the rotary shaft 5, and is connected to the variable geometry turbine 2 to be coaxially rotatable through the rotary shaft 5. When the exhaust gas of the engine 100 is used as a working fluid and the variable geometry turbine 2 is rotated, the compressor 3 is rotated by the rotation force and intake (turbocharging) is performed in the engine 100.

(Overall Configuration of Variable Geometry Turbine)

Figure 2:
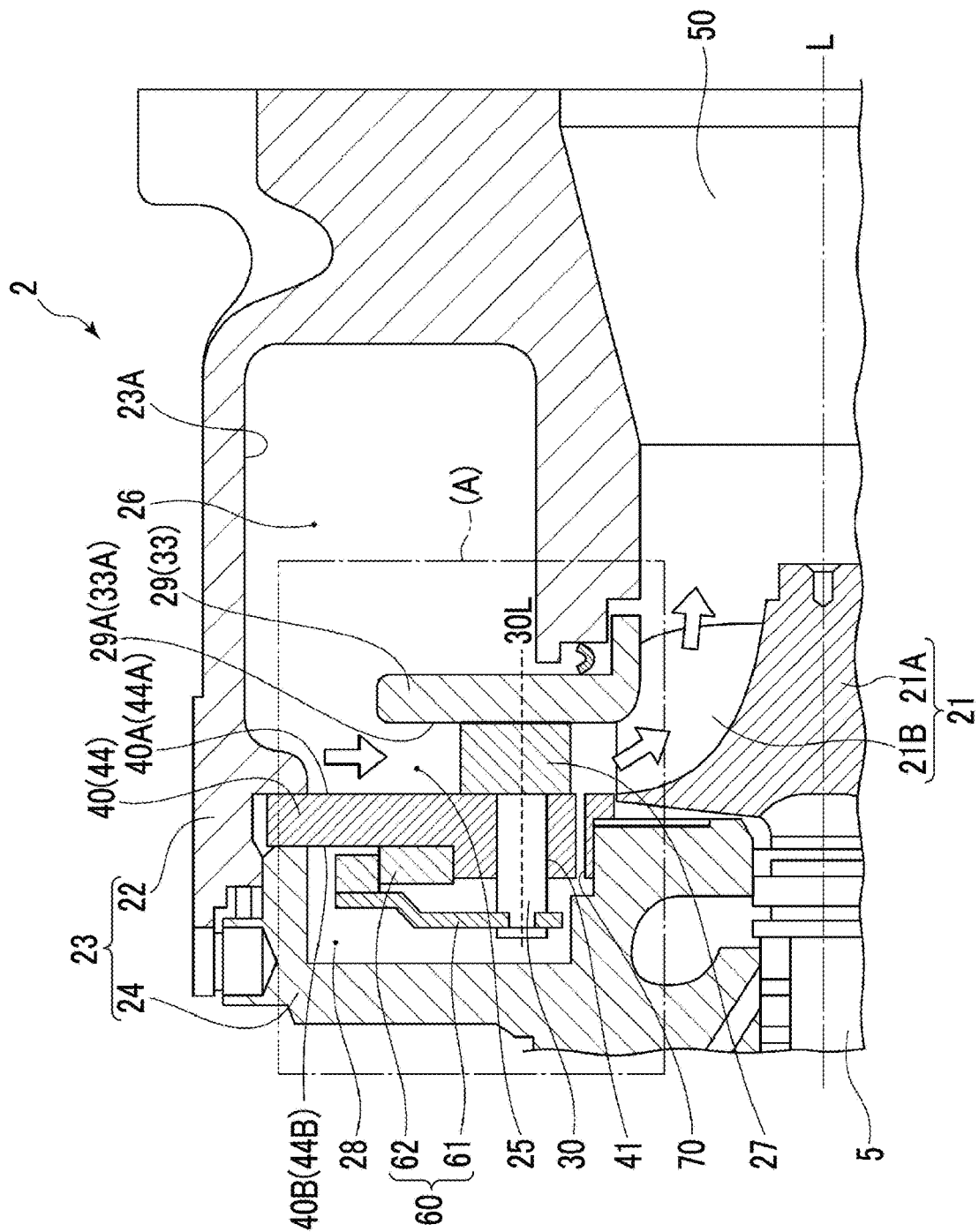
FIG. 2 is a schematic partial cross-sectional view showing a variable geometry turbine according to the embodiment.

FIG. 2 is a schematic partial cross-sectional view showing the variable geometry turbine according to the embodiment.

As shown in FIG. 2, the variable geometry turbine 2 includes a turbine impeller 21, a housing 23 that accommodates the turbine impeller 21, a plurality of nozzle vanes 27 that are disposed in a nozzle flow path 25 formed in the housing 23, and a link mechanism 60 that changes a vane angle of each of the plurality of nozzle vanes 27 by rotating each of the plurality of nozzle vanes 27.

The turbine impeller 21 includes a hub 21A that is connected to the rotary shaft 5, and a plurality of rotor blades 21B that are arranged in a circumferential direction on an outer peripheral surface of the hub 21A. The exhaust gas flowing through the nozzle flow path 25 acts on the rotor blade 21B, so that the turbine impeller 21 and the rotary shaft 5 connected to the turbine impeller 21 are configured to rotate.

The housing 23 is configured to accommodate the turbine impeller 21 to be rotatable. Inside the housing 23, a scroll flow path 26 that is located on an outer peripheral side of the turbine impeller 21 and that is defined by a scroll inner wall portion 23A, the nozzle flow path 25 for introducing the exhaust gas that has flowed through the scroll flow path 26 to the turbine impeller 21, an outlet-side flow path 50 for discharging the exhaust gas that has passed through the turbine impeller 21 to the outside, and a link compartment 28 (to be described later) are defined. Arrows in the figure indicate a flow direction of the exhaust gas.

In the shown embodiment, the housing 23 includes a turbine housing 22 that defines the scroll flow path 26 and the outlet-side flow path 50 therein and that accommodates the turbine impeller 21 therein, and a bearing housing 24 that accommodates a bearing (not shown) that rotatably supports the rotary shaft 5.

In addition, in the embodiment (not shown), the housing 23 may be configured to be one housing member in which the turbine housing 22 and the bearing housing 24 are integrally formed.

Each of the plurality of nozzle vanes 27 is disposed at an interval along the circumferential direction of the turbine impeller 21 in the nozzle flow path 25. Each of the plurality of nozzle vanes 27 is connected to one end side of a nozzle shaft 30 in an axial direction, and the other end side of the nozzle shaft 30 in the axial direction is connected to the link mechanism 60 (to be described later). Each of the plurality of nozzle vanes 27 is configured to adjust an opening degree between a fully closed state and a fully open state by means of the link mechanism 60 (to be described later) via the nozzle shaft 30.

(Link Mechanism)

The link mechanism 60 includes a plurality of lever plates 61 and one drive ring 62 to which each of the plurality of lever plates 61 is connected. Each of the plurality of nozzle vanes 27 is connected to one end side (radial inner side) of the lever plate 61 through the nozzle shaft 30. In addition, the other end side (radial outer side) of the lever plate 61 is connected to a disk-shaped drive ring 62.

The drive ring 62 is driven by an actuator (not shown) and is rotatable around the rotary shaft 5. When the drive ring 62 rotates, each lever plate 61 rotates, and accordingly, the nozzle shaft 30 rotates about an axis line 30L along the axial direction. Then, the opening degree (vane angle) of the nozzle vane 27 is changed by the nozzle shaft 30.

A link compartment 28 in which the link mechanism 60 is accommodated is formed inside the housing 23. The link compartment 28 is partitioned from the nozzle flow path 25 by a hub-side member 40 having a hub-side surface 40A defining the nozzle flow path 25, specifically, by the other surface 40B of the hub-side member 40. The nozzle flow path 25 is defined by the hub-side surface 40A of the hub-side member 40 and by a shroud side surface 29A of a shroud-side member 29 provided on one side (side separated from the compressor 3) of the rotary shaft 5 with respect to the hub-side member 40. The link mechanism 60 and each of the plurality of nozzle vanes 27 are connected to each other through the nozzle shaft 30 penetrating the hub-side member 40. Specifically, the hub-side member 40 has a through-hole 41 through which the nozzle shaft 30 penetrates, and the nozzle shaft 30 penetrates through the through-hole 41 of the hub-side member 40 and is rotatably supported.

(Configuration of Communication Hole)

Figure 3:
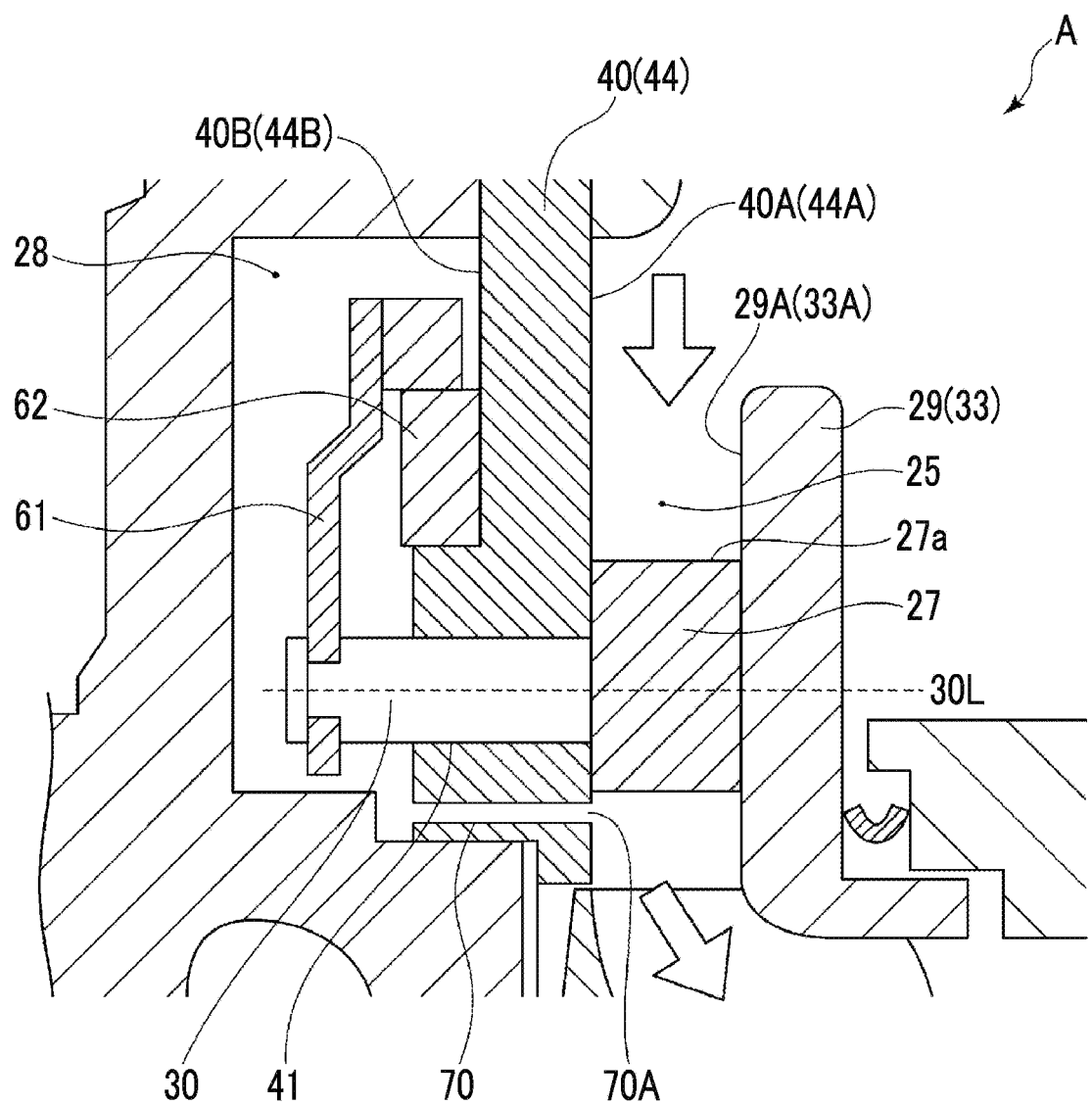
FIG. 3 is an enlarged cross-sectional view of a main part of FIG. 2.

FIG. 3 is an enlarged cross-sectional view of a main part (A) of FIG. 2.

Figure 4:
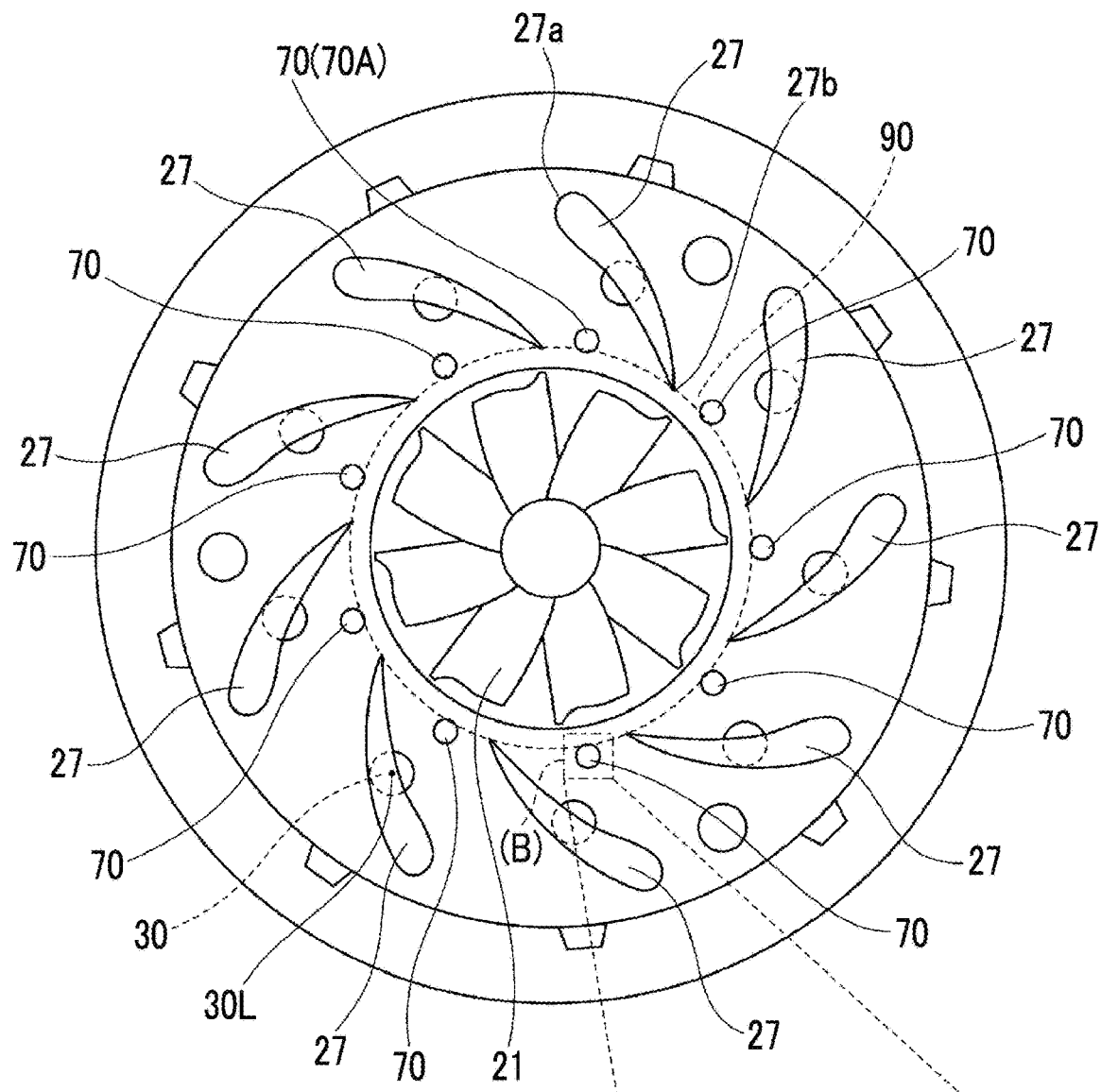
FIG. 4 is a view for describing a positional relationship between a nozzle vane and a communication hole in the variable geometry turbine according to the embodiment.
Figure 4:
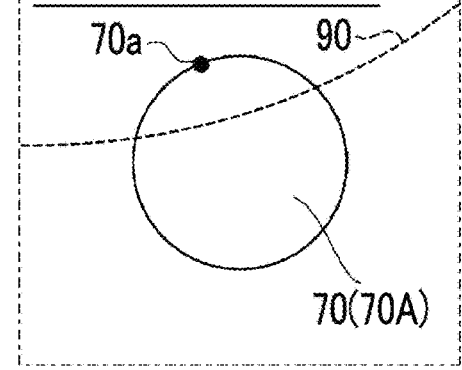

FIG. 4 is a view for describing a positional relationship between a nozzle vane and a communication hole in the variable geometry turbine according to the embodiment. In FIG. 4, the turbine housing 22 and the shroud-side member 29 are not shown, and the variable geometry turbine 2 in which each of the plurality of nozzle vanes 27 is in a fully open state is viewed from a front side (from one side toward the other side of the rotary shaft 5).

As shown in FIG. 3, the hub-side member 40 is formed with at least one communication hole 70 through which the nozzle flow path 25 and the link compartment 28 communicate with each other. The communication hole 70 is a hole into which the nozzle shaft 30 is not inserted, unlike the through-hole 41 described above.

As shown in FIG. 4, an opening 70A (the opening 70A of the communication hole 70 provided in the hub-side surface 40A of the hub-side member 40) of at least one communication hole 70 on the nozzle flow path 25 side is formed on the inner side in the radial direction from a leading edge 27a of each of the plurality of nozzle vanes 27 in a case where each of the plurality of nozzle vanes 27 is in a fully open state.

The hole shape of the communication hole 70 may be such that the exhaust gas can communicate, and is not particularly limited. In the shown embodiment, the hole shape of the communication hole 70 has a circular shape.

(Description of FIGS. 5 to 7B)

Figure 5:
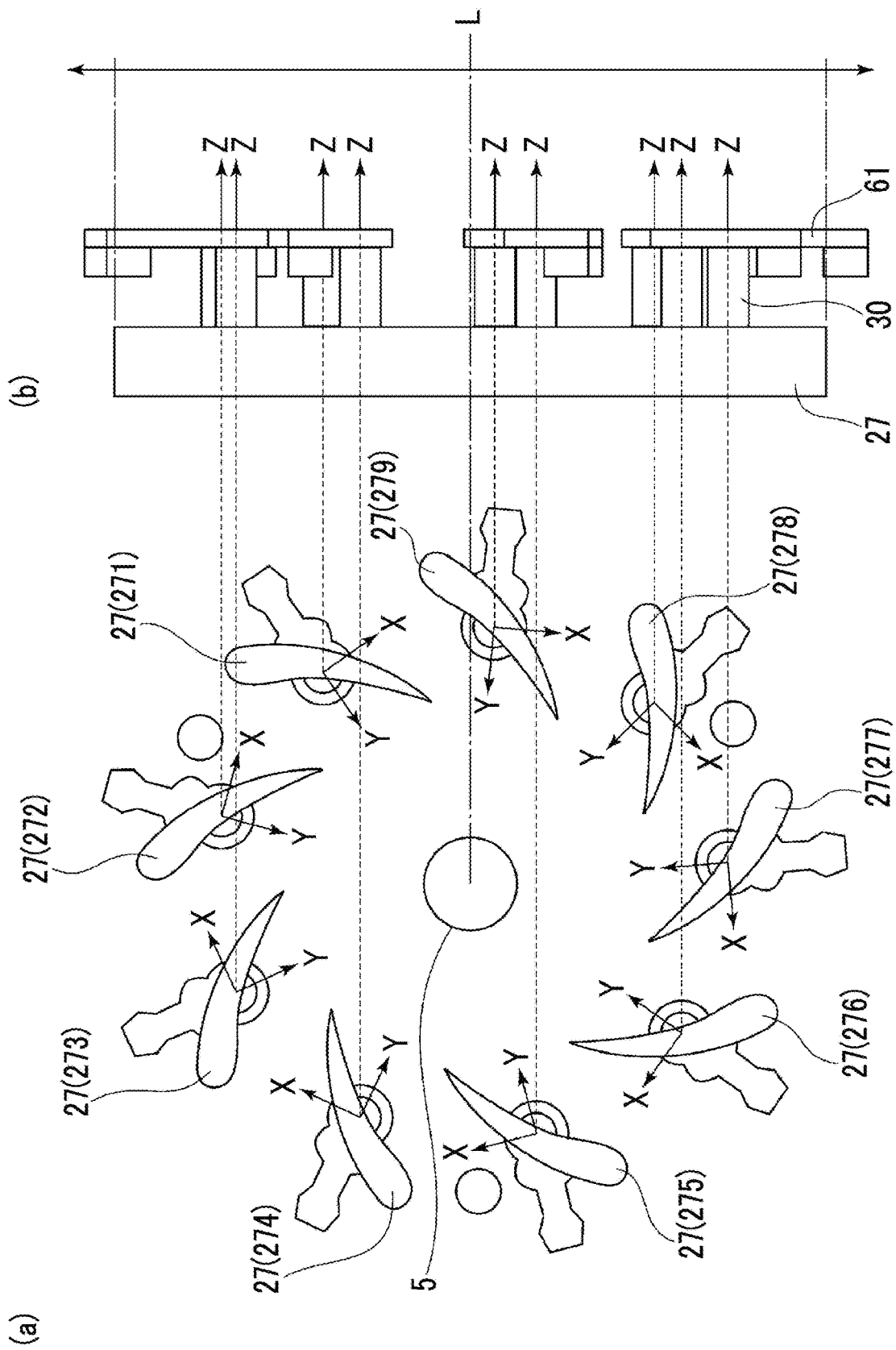
FIG. 5 is a view for describing an action direction of an axial force (a Z-direction force) acting on each of a plurality of nozzle vanes in the variable geometry turbine according to the embodiment.

FIG. 5 is a view for describing an action direction of an axial force (a Z-direction force) acting on each of a plurality of nozzle vanes in the variable geometry turbine according to the embodiment.

A part (a) of FIG. 5 is a schematic view showing a state where each of the plurality of nozzle vanes 27 is disposed on a plane orthogonal to an axis line L of the rotary shaft 5. In the part (a) of FIG. 5, a Y direction indicates the radial direction of the turbine impeller 21, and an X direction indicates a direction orthogonal to the Y direction. In addition, a part (b) of FIG. 5 is a schematic view in which each of the plurality of nozzle vanes 27 is viewed from the side. In the part (b) of FIG. 5, a Z direction indicates a direction orthogonal to the X direction and the Y direction, and is a direction parallel to the axis line L of the rotary shaft 5.

In the embodiment shown in FIG. 5, nine nozzle vanes 27 (271 to 279) are disposed at intervals along the circumferential direction of the turbine impeller 21.

Figure 8:
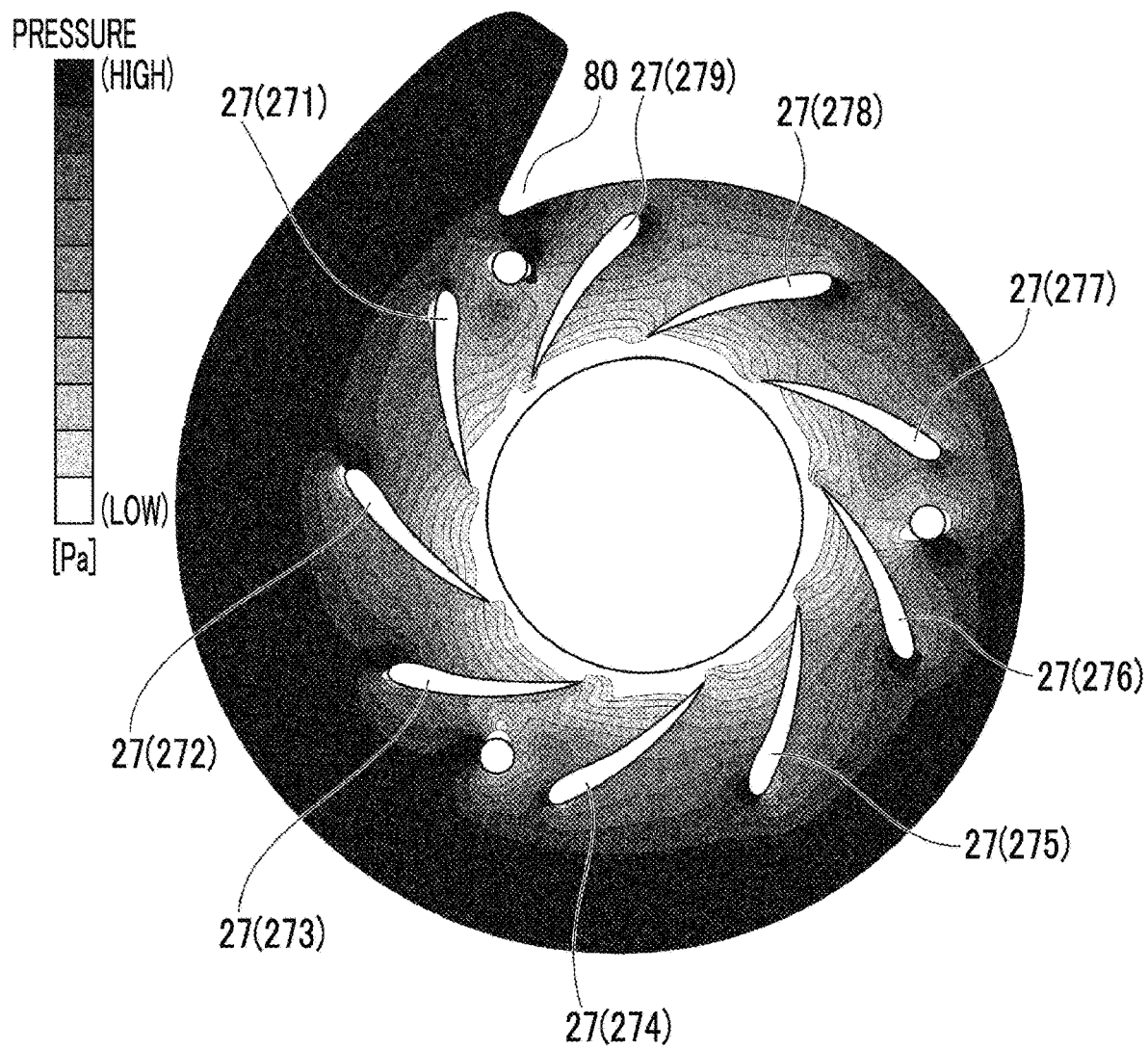
FIG. 8 is a radial cross-sectional view showing a pressure distribution of the nozzle flow path in the variable geometry turbine according to the embodiment.

As shown in FIG. 8 to be described later, the nozzle vane 27 which is disposed at the start of winding (upstream side) of the scroll flow path 26 and is closest to a tongue portion 80 (FIG. 8) partitioning the start and end of winding of the scroll flow path 26 is denoted by reference numeral 271, and each of nozzle vanes 272 to 279 is disposed toward a downstream side of the flow direction of the exhaust gas (in a counterclockwise order of in FIG. 8).

Figure 6:
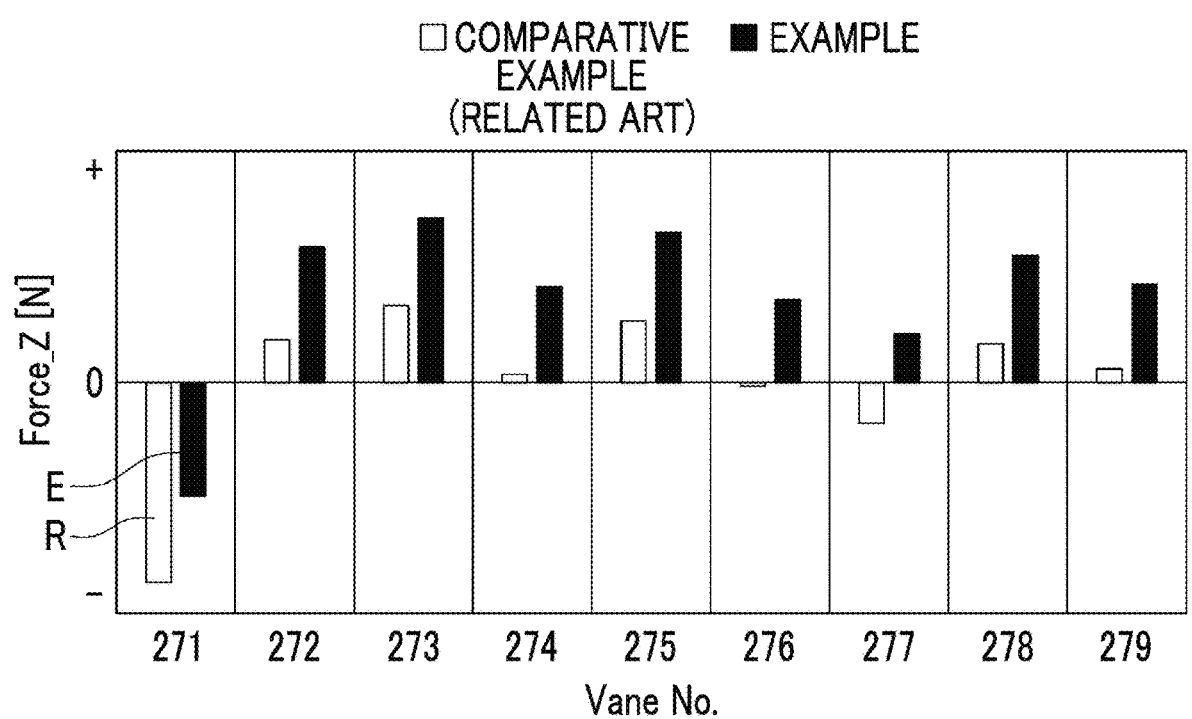
FIG. 6 is a graph showing an analysis result of an axial force (a Z-direction force) acting on each of the plurality of nozzle vanes in the variable geometry turbine according to the embodiment.

FIG. 6 is a graph showing an analysis result of an axial force (a Z-direction force) acting on each of the plurality of nozzle vanes in the variable geometry turbine according to the embodiment.

In FIG. 6, a horizontal axis of the graph indicates the reference numerals of the nozzle vanes 27 (271 to 279), and a vertical axis of the graph indicates the magnitude of the Z-direction force. The Z-direction force acting on the nozzle vane 27 is expressed by a force direction from the nozzle flow path 25 toward the link compartment 28 along the axis line L of the rotary shaft 5 being positive (+) and a force direction from the link compartment 28 toward the nozzle flow path 25 being negative (−).

In addition, in FIG. 6, reference sign E indicates an analysis result (example) of the variable geometry turbine 2 according to the embodiment in which the communication hole 70 is formed, and reference sign R indicates an analysis result (comparative example) of the variable geometry turbine in the related art: in which the communication hole 70 is not formed.

As shown in FIG. 6, in the comparative example, the Z-direction forces are small (close to 0) in the nozzle vanes 274, 276, and 279.

On the other hand, in the example, the value of the Z-direction forces is larger in the positive direction than in the comparative example. Therefore, in the comparative example, the Z-direction forces are small (close to 0) in the nozzle vanes 274, 276, and 279, while in the example, the Z-direction forces in the nozzle vanes 274, 276, and 279 increase in the positive direction, and large Z-direction forces act.

Figure 7A:
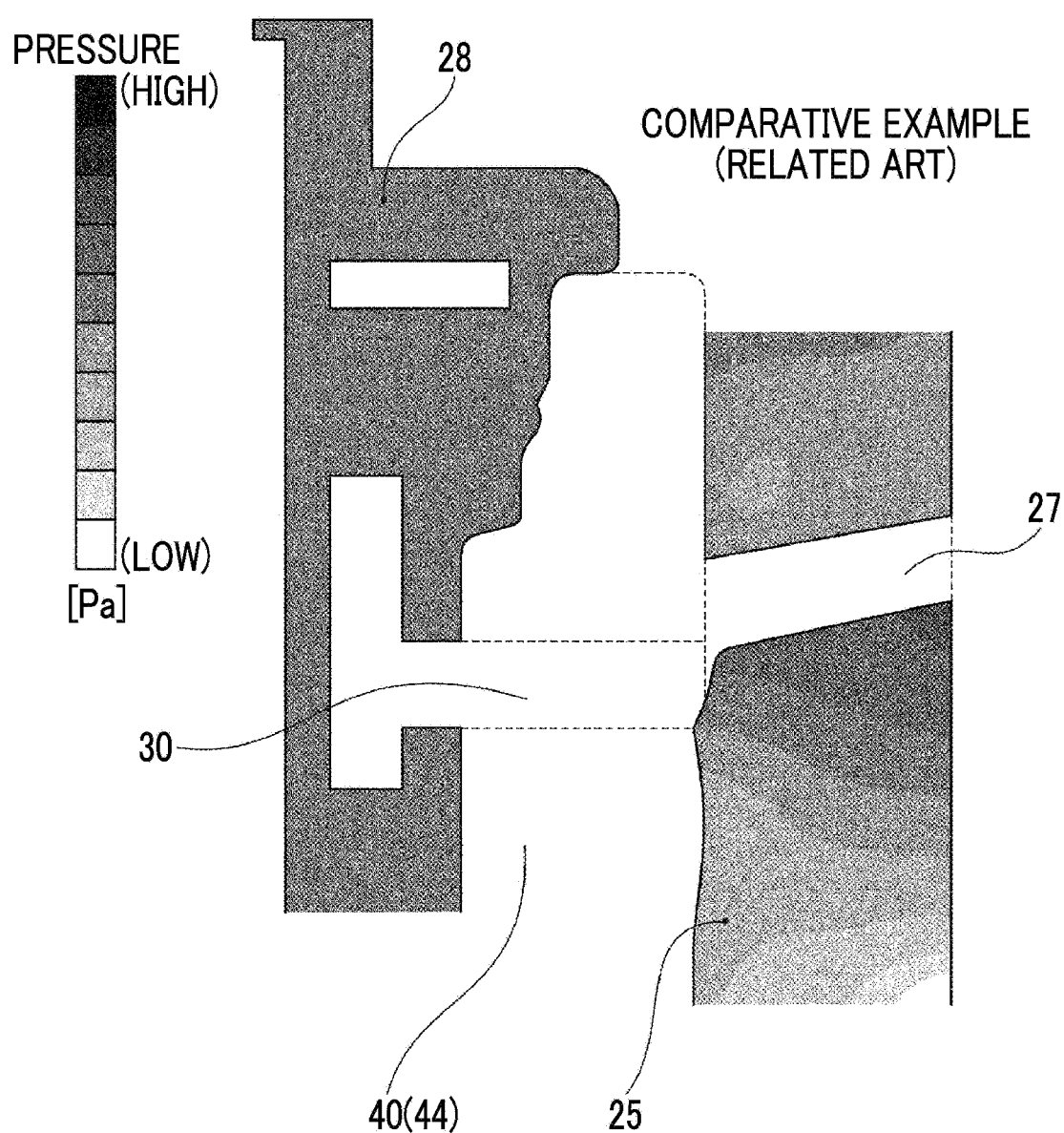
FIG. 7A is a diagram showing a pressure distribution in a nozzle flow path and a link compartment in the variable geometry turbine according to the embodiment, and is a diagram showing an analysis result (comparative example) in a variable geometry turbine in the related art in which the communication hole is not formed.
Figure 7B:
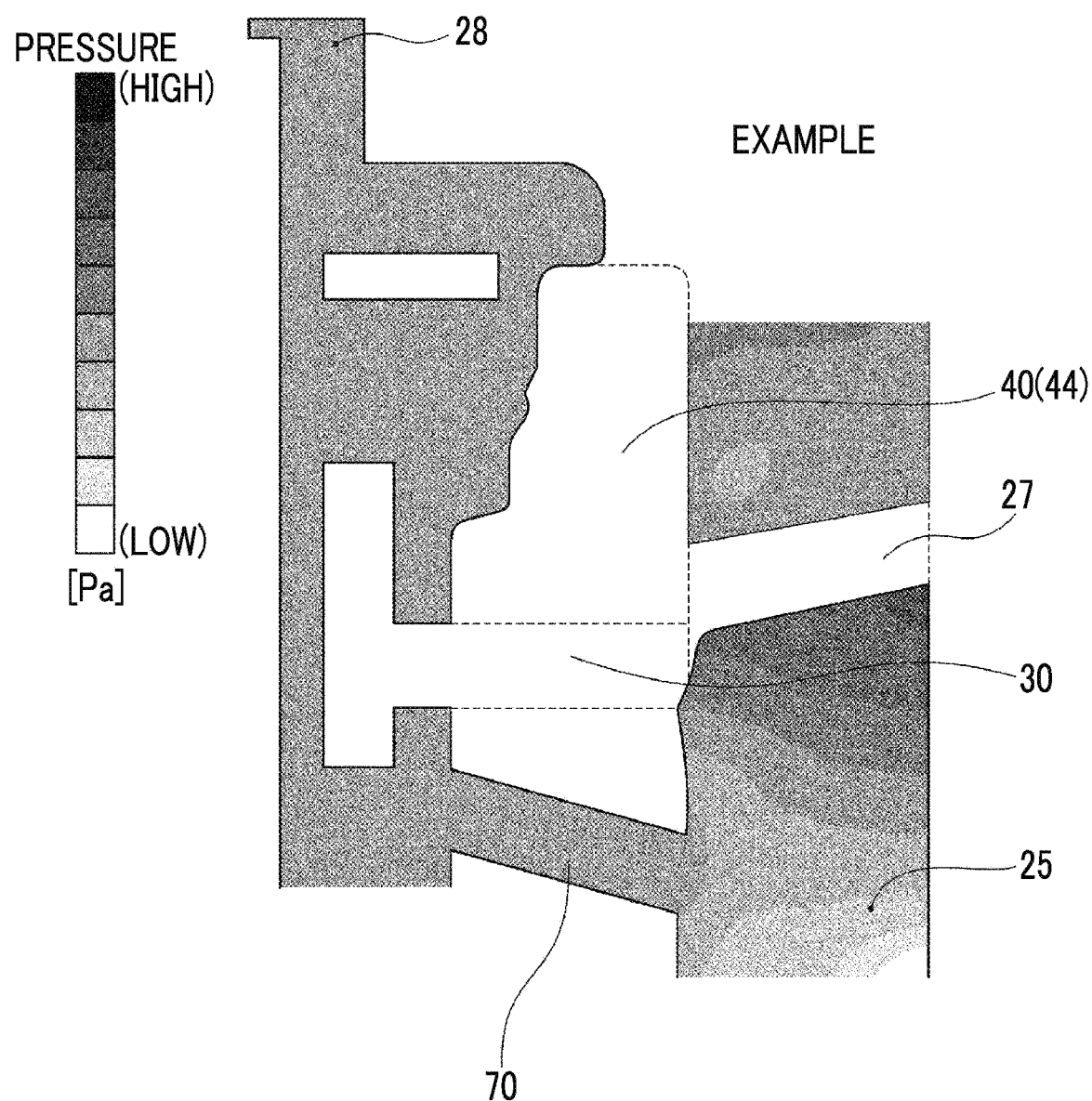
FIG. 7B is a diagram showing a pressure distribution in the nozzle flow path and the link compartment in the variable geometry turbine according to the embodiment, and is a diagram showing an analysis result (example) in the variable geometry turbine according to the embodiment in which the communication hole is formed.

FIGS. 7A and 7B are views showing pressure distributions in the nozzle flow path and the link compartment in the variable geometry turbine according to the embodiment. FIG. 7A shows an analysis result (comparative example) in the variable geometry turbine of the related art in which the communication hole 70 is not formed, and FIG. 7B shows an analysis result (example) in the variable geometry turbine 2 according to the embodiment in which the communication hole 70 is formed. In addition, in FIGS. 7A and 7B, the magnitude of the pressure obtained from numerical analysis is represented by color density. The lighter the color is, the lower the pressure is, and the darker the color is, the higher the pressure is.

In the example of FIG. 7B in which the communication hole 70 is formed, the pressure in the link compartment 28 is lower than that in the comparative example of FIG. 7A. In the nozzle flow path 25, there is no significant change in the magnitude of the pressure in the comparative example of FIG. 7A and the example of FIG. 7B. That is, in the example of FIG. 7B in which the communication hole 70 is formed, the difference between the pressure in the link compartment 28 and the pressure of the nozzle flow path 25 at the position adjacent to the nozzle shaft 30 in the radial direction is larger than that in the comparative example of FIG. 7A, since the pressure in the link compartment 28 is reduced.

(Effects of Action)

As described with reference to FIG. 5, in each of the plurality of nozzle vanes 27, a force in the axial direction (Z direction) in addition to a force in the circumferential direction (X direction) or in the radial direction (Y direction) acts. The Z-direction force is a force generated by a pressure difference between the nozzle flow path 25 and the link compartment 28, and becomes larger as the pressure difference between the nozzle flow path 25 (high pressure side) and the link compartment 28 (low pressure side) becomes larger.

As shown in FIG. 6, according to investigations conducted by the present inventors, it was revealed that some of the plurality of nozzle vanes include the plurality of nozzle vanes 27 (274, 276, and 279) having small (close to 0) Z-direction forces. In the nozzle vane 27 having the small Z-direction force, the nozzle vane 27 is easily moved in the Z direction due to the influence of the external force. Therefore, the unnecessary movement of the nozzle vane 27 described above is more likely to occur, and the nozzle vane 27 is more likely to be worn.

The pressure of the exhaust gas flowing through the nozzle flow path 25 is reduced by controlling the flow velocity and the flow direction by means of the nozzle vane 27. Therefore, the pressure of the exhaust gas flowing on the inner side in the radial direction with respect to the leading edge 27a of each of the plurality of nozzle vanes 27 is lower than the pressure of the exhaust gas flowing on the outer side in the radial direction with respect to each of the leading edges 27a.

According to the variable geometry turbine 2 according to the present disclosure, the opening 70A of at least one communication hole 70 on the nozzle flow path 25 side is formed on the inner side in the radial direction with respect to the leading edge 27a of each of the plurality of nozzle vanes 27 in a case where each of the plurality of nozzle vanes 27 is in a fully open state. Therefore, as shown in FIGS. 7A and 7B, the pressure in the link compartment 28 can be reduced by the exhaust gas filling the link compartment 28 flowing out to the nozzle flow path 25 from the communication hole 70. Accordingly, the pressure difference between the nozzle flow path 25 and the link compartment 28 is increased, and the Z-direction force acting on some of the nozzle vanes 27 is increased. In this manner, it is possible to suppress the unnecessary movement of the nozzle vanes 27 described above and to suppress the progress of wear of the nozzle vanes 27.

In some embodiments, as shown in FIG. 2, the hub-side member 40 is formed as a nozzle mount 44 separate from the turbine housing 22 and the bearing housing 24. The nozzle mount 44 is an annular plate-shaped member extending in the circumferential direction on the outer peripheral side of the turbine impeller 21. The nozzle mount 44 is supported in the housing 23 by an outer peripheral edge portion of the nozzle mount 44 being sandwiched between the turbine housing 22 and the bearing housing 24.

The link compartment 28 described above is defined by the bearing housing 24 and the other surface 44B of the nozzle mount 44.

According to such a configuration, since the communication hole 70 may be formed in the nozzle mount 44 which is an annular member, it is possible to reduce manufacturing costs as compared with forming the communication hole 70 in the bearing housing 24 or the turbine housing 22 having a complicated shape.

In addition, in the embodiment (not shown), the hub-side member 40 may be formed to be integrated with the turbine housing 22 or the bearing housing 24.

In some embodiments, as shown in FIG. 2, the shroud-side member 29 is formed as a nozzle plate 33 separate from the turbine housing 22. The nozzle plate 33 is supported within the housing 23 by fixing one end side of a shroud side surface 33A of the nozzle plate 33 to the other end side of a nozzle support (not shown) fixed to a hub-side surface 44A of the nozzle mount 44. The nozzle flow path 25 described above is defined by the hub-side surface 44A of the nozzle mount 44 and by the shroud side surface 33A of the nozzle plate 33.

In addition, in the embodiment (not shown), the shroud-side member 29 may be formed to be integrated with the turbine housing 22.

(Description of FIG. 8)

FIG. 8 is a diagram showing a pressure distribution of a nozzle flow path in the variable geometry turbine according to the embodiment. In FIG. 8, the nozzle flow path 25 is viewed along the axis line L of the rotary shaft 5. In FIG. 8, the magnitude of the pressure obtained by numerical analysis is represented by color density. The lighter the color is, the lower the pressure is, and the darker the color is, the higher the pressure is. In FIG. 8, the opening 70A of the communication hole 70 on the nozzle flow path 25 side is not described, but the opening 70A is disposed at the same position as in FIG. 10 to be described later.

As shown in FIG. 8, the pressure of the exhaust gas in the nozzle flow path 25 starts to decrease from the upstream vicinity of the leading edge 27a of the nozzle vane 27 and gradually decreases toward the radial inner side.

In some embodiments, as shown in FIG. 4, the opening 70A of the communication hole 70 on the nozzle flow path 25 side is formed on the inner side in the radial direction with respect to the nozzle shaft 30. That is, the center (the center of the drawing) of the opening 70A is located on the inner side in the radial direction with respect to the axis line 30L of the nozzle shaft 30.

In the shown embodiment, the opening 70A has an area smaller than that of the through-hole 41.

According to such a configuration, the pressure of the nozzle flow path 25 becomes lower toward the radial inner side. Therefore, the opening 70A of the communication hole 70 on the nozzle flow path 25 side, which penetrates the nozzle flow path 25 and the link compartment 28, is formed on the inner side in the radial direction with respect to the nozzle shaft 30 such that the pressure in the link compartment 28 can be further efficiently reduced.

In some embodiments, as shown in FIG. 4, the opening 70A of the communication hole 70 on the nozzle flow path 25 side is formed at a position overlapping with a concentric circle 90 passing through a trailing edge 27b of each of the plurality of nozzle vanes 27 in a case where each of the plurality of nozzle vanes 27 is in a fully open state.

That is, in a case where each of the plurality of nozzle vanes 27 is in a fully open state, an opening portion 70a, which is closest to the inner side in the radial direction, among the openings 70A of the communication holes 70 on the nozzle flow path 25 side is formed to be in contact with a line segment of the concentric circle 90 or to be closer to the inner side in the radial direction than the line segment of the concentric circle 90 is (refer to the enlarged view of part B).

In addition, the opening 70A of the communication hole 70 on the nozzle flow path 25 side may be formed on the inner side in the radial direction with respect to the concentric circle 90. That is, the center (center of the drawing) of the opening 70A is located on the inner side in the radial direction with respect to a line segment of the concentric circle 90.

As shown in FIG. 8, the pressure of the exhaust gas in the nozzle flow path 25 is lower on the radial inner side. In a case where each of the plurality of nozzle vanes 27 is in a fully open state, a position overlapping with the concentric circle 90 and a position on the inner side in the radial direction with respect to the concentric circle 90 are regions where the pressure is the lowest.

According to such a configuration, the pressure of the nozzle flow path 25 becomes lower toward the radial inner side. Therefore, the opening 70A of the communication hole 70 on the nozzle flow path 25 side, which penetrates the nozzle flow path 25 and the link compartment 28, is formed at a position overlapping with the concentric circle 90, or is formed on the inner side in the radial direction with respect to the concentric circle 90 such that the pressure in the link compartment 28 can be further efficiently reduced.

Figure 9:
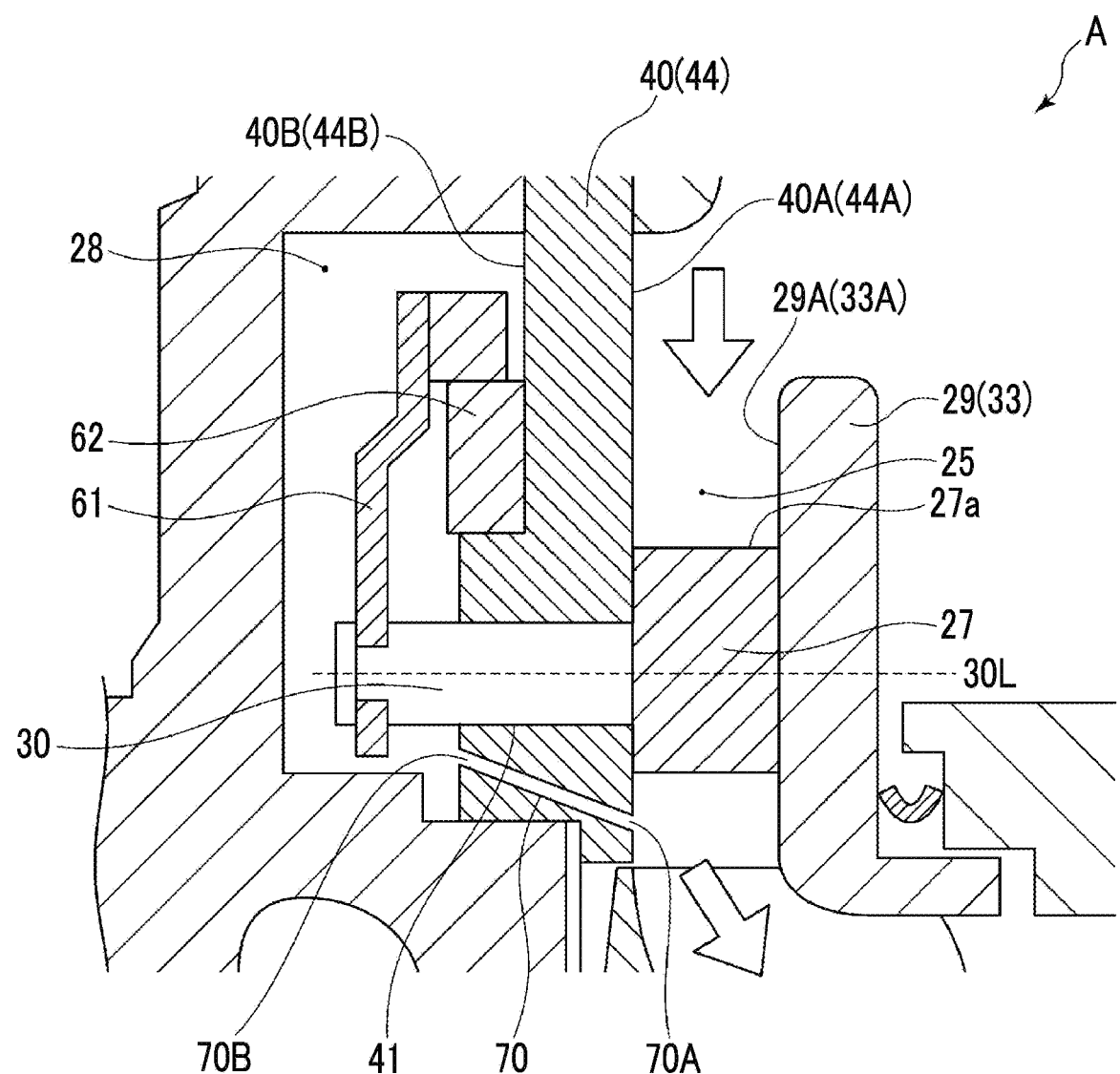
FIG. 9 is an enlarged cross-sectional view of a main part of FIG. 2 in a different embodiment from FIG. 3.

FIG. 9 is an enlarged cross-sectional view of a main part (A) of FIG. 2 in a different embodiment from FIG. 3.

In some embodiments, as shown in FIG. 9, the opening 70A of at least one communication hole 70 on the nozzle flow path 25 side and an opening 70B of at least one communication hole 70 on the link compartment 28 side are formed such that the positions thereof in the radial direction are different from each other.

According to such a configuration, it is not necessary to make the opening 70A of the communication hole 70 on the nozzle flow path 25 side and the opening 70B of the communication hole 70 on the link compartment 28 side coincide with each other in the radial direction. Therefore, the degree of freedom in the layout for providing the opening 70B of the communication hole 70 on the link compartment 28 side can be increased in the link compartment 28 having a limited space.

In addition, in some embodiments, the opening 70A of at least one communication hole 70 on the nozzle flow path 25 side and the opening 70B of at least one communication hole 70 on the link compartment 28 side may be formed at positions different from each other in the circumferential direction.

According to such a configuration, it is not necessary to make the opening 70A of the communication hole 70 on the nozzle flow path 25 side and the opening 70B of the communication hole 70 on the link compartment 28 side coincide with each other in the circumferential direction. Therefore, the degree of freedom in the layout for providing the opening 70B of the communication hole 70 on the link compartment 28 side can be increased in the link compartment 28 having a limited space.

In some embodiments, as shown in FIG. 9, the opening 70A of at least one communication hole 70 on the nozzle flow path 25 side is formed on the inner side in the radial direction with respect to the opening 70B of at least one communication hole 70 on the link compartment 28 side.

According to such a configuration, the opening 70A on the nozzle flow path 25 side may be formed on the inner side in the radial direction, regardless of the position of the opening 70B of the communication hole 70 on the link compartment 28 side in the radial direction. The pressure of the nozzle flow path 25 becomes lower toward the inner side in the radial direction. Therefore, by forming the opening 70A on the nozzle flow path 25 side on the further inner side in the radial direction, the pressure in the link compartment 28 can be further efficiently reduced.

In addition, in some embodiments, the opening 70A of at least one communication hole 70 on the nozzle flow path 25 side may be formed on the upstream side in the flow direction of the exhaust gas in the circumferential direction with respect to the opening 70B of at least one communication hole 70 on the link compartment 28 side.

According to such a configuration, the exhaust gas is likely to flow from the opening 70A to the opening 70B. Therefore, the pressure in the link compartment 28 can be further efficiently reduced.

Figure 10:
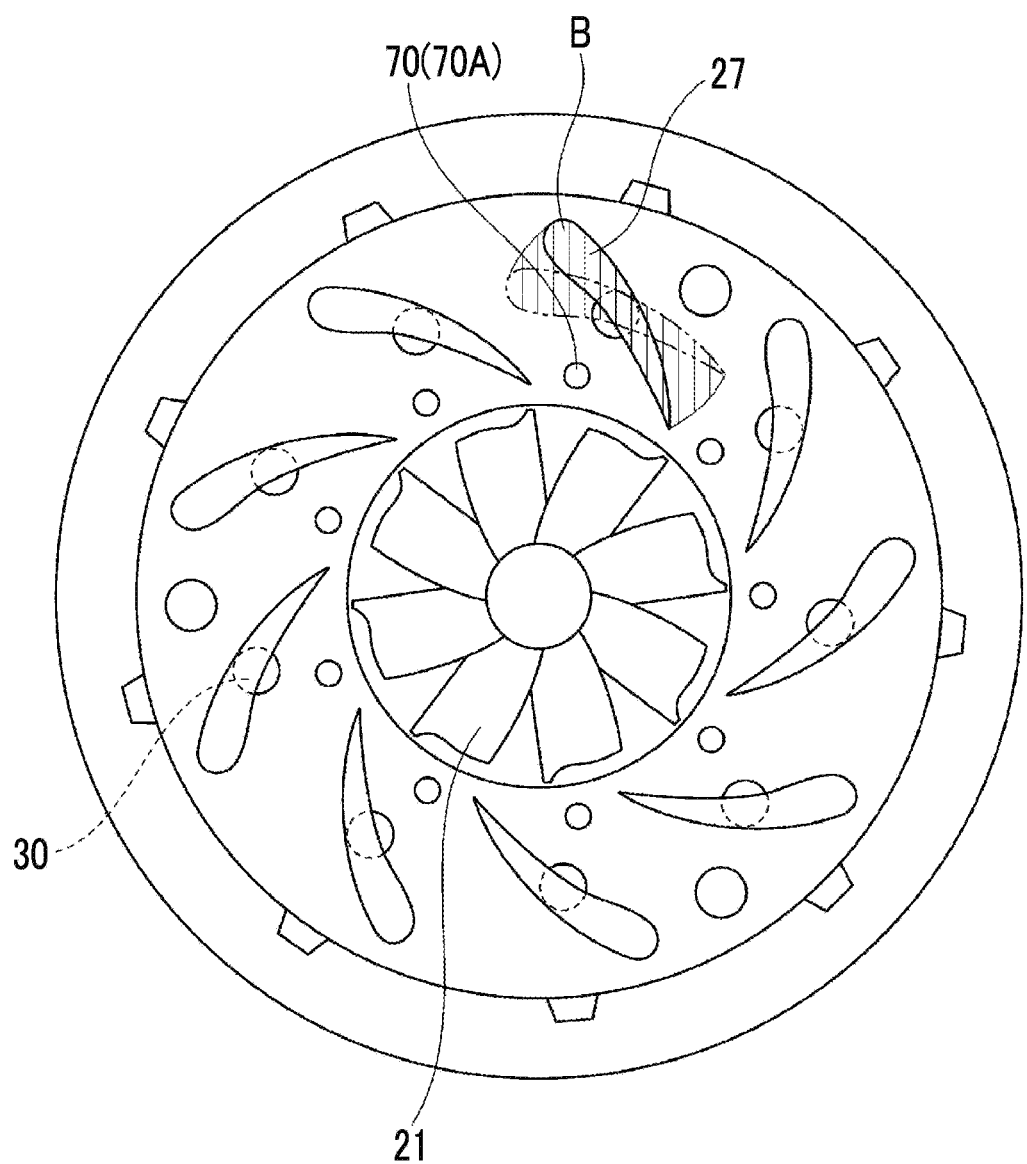
FIG. 10 is a view for describing a positional relationship between the nozzle vane and the communication hole in the variable geometry turbine according to the embodiment.

FIG. 10 is a view for describing a positional relationship between the nozzle vane and the communication hole in the variable geometry turbine according to the embodiment. In FIG. 10, the turbine housing 22 and the shroud-side member 29 are not shown, and the plurality of nozzle vanes 27 in the fully open state and the nozzle vane 27 in the fully closed state are viewed from the front side (from one side toward the other side of the rotary shaft 5). The nozzle vane 27 in the fully open state is indicated by a solid line, and the nozzle vane 27 in the fully closed state is indicated by a two-dot chain line.

In some embodiments, as shown in FIG. 10, the opening 70A of at least one communication hole 70 on the nozzle flow path 25 side is formed not to overlap with each of the plurality of nozzle vanes 27 even in a case where each of the plurality of nozzle vanes 27 is in any opening degree state from the fully open state to the fully closed state.

The opening degree state of the nozzle vane 27 changes in a range from the fully open state to the fully closed state. However, as shown in FIG. 10, when the nozzle vane 27 is movable from the fully open state to the fully closed state and a region where the nozzle vane 27 can be located is set as a movable region B, the opening 70A of the communication hole 70 on the nozzle flow path 25 side is formed at a position that does not overlap with the movable region B.

According to such a configuration, the nozzle vane 27 does not block the communication hole 70 through which the nozzle flow path 25 and the link compartment 28 communicate with each other in a case where the nozzle vane 27 is in any opening degree state from the fully open state to the fully closed state. Therefore, the communication hole 70 can always maintain a state in which the nozzle flow path 25 and the link compartment 28 communicate with each other. In addition, since the nozzle vane 27 does not block a part of the communication hole 70, the communication hole 70 can always maintain the opening even while the variable geometry turbine 2 is being operated. Therefore, the pressure in the link compartment 28 can be reduced.

The present disclosure is not limited to the above-described embodiments, and also includes a form in which modifications are added to the above-described embodiments or a form in which the embodiments are combined with each other as appropriate.

Contents described in some of the above-described embodiments are understood as follows, for example.

1) A variable geometry turbine (2) according to one aspect includes:

a turbine impeller (21);
 a housing (23) that accommodates the turbine impeller;
 a plurality of nozzle vanes (27) that are disposed in
 a nozzle flow path (25) formed inside the housing (23); and
 a link mechanism (60) that changes a vane angle of each of the plurality of nozzle vanes by rotating each of the plurality of nozzle vanes (27),
 in which a link compartment (28) that accommodates the link mechanism (60) and that is partitioned from the nozzle flow path (25) by a hub-side member (40) having a hub-side surface defining the nozzle flow path (25) is formed inside the housing (23), the link mechanism (60) and each of the plurality of nozzle vanes (27) are connected to each other through a nozzle shaft (30) penetrating the hub-side member (40), at least one communication hole (70) through which the nozzle flow path (25) and the link compartment (28) communicate with each other is formed in the hub-side member (40), and an opening of the at least one communication hole (70) on a nozzle flow path (25) side is formed on an inner side in a radial direction of the turbine impeller (21) with respect to a leading edge of each of the plurality of nozzle vanes (27) in a case where each of the plurality of nozzle vanes (27) is in a fully open state.

In each of the plurality of nozzle vanes, a force in the axial direction (Z direction) in addition to a force in the circumferential direction (X direction) or in the radial direction (Y direction) acts. The Z-direction force is a force generated by a pressure difference between the nozzle flow path and the link compartment, and becomes larger as the pressure difference between the nozzle flow path (high pressure side) and the link compartment (low pressure side) becomes larger.

According to investigations conducted by the present inventors, it was revealed that some of the plurality of nozzle vanes include the nozzle vanes 274, 276, and 279 having small (close to 0) Z-direction forces. In the nozzle vane having the small Z-direction force, the nozzle vane is easily moved in the Z direction due to the influence of the external force. Therefore, the unnecessary movement of the nozzle vane described above is more likely to occur, and the nozzle vane is more likely to be worn.

The pressure of the exhaust gas flowing through the nozzle flow path is reduced by controlling the flow velocity and the flow direction by means of the nozzle vane. Therefore, the pressure of the exhaust gas flowing on the inner side in the radial direction with respect to the leading edge of each of the plurality of nozzle vanes is lower than the pressure of the exhaust gas flowing on the outer side in the radial direction with respect to each of the leading edges.

According to the variable geometry turbine according to the present disclosure, the opening of the at least one communication hole on the nozzle flow path side is formed on the inner side in the radial direction with respect to the leading edge of each of the plurality of nozzle vanes in a case where each of the plurality of nozzle vanes is in the fully open state. Therefore, the low-pressure exhaust gas flowing through the nozzle flow path can flow into the link compartment from the communication hole, and the pressure inside the link compartment can be reduced. Accordingly, the pressure difference between the nozzle flow path and the link compartment is increased, and the Z-direction force acting on some of the nozzle vanes is increased. In this manner, it is possible to suppress the unnecessary movement of the nozzle vanes described above and to suppress the progress of wear of the nozzle vanes.

2) The variable geometry turbine (2) according to another aspect is the variable geometry turbine (2) according to 1), in which the opening of the communication hole on the nozzle flow path (25) side is formed on the inner side in the radial direction with respect to the nozzle shaft (30).

According to such a configuration, the pressure of the nozzle flow path becomes lower toward the radial inner side. Therefore, the opening of the communication hole on the nozzle flow path side, which penetrates the nozzle flow path and the link compartment, is formed on the inner side in the radial direction of the nozzle shaft such that the pressure in the link compartment can be further efficiently reduced.

3) The variable geometry turbine (2) according to still another aspect is the variable geometry turbine (2) according to 1) or 2), in which in a case where each of the plurality of nozzle vanes (27) is in the fully open state, the opening (70A) of the communication hole (70) on the nozzle flow path (25) side is formed at a position overlapping with a concentric circle (90) passing through a trailing edge of each of the plurality of nozzle vanes (27), or is formed on the inner side in the radial direction with respect to the concentric circle (90).

According to such a configuration, the pressure of the nozzle flow path becomes lower toward the radial inner side. Therefore, the opening of the communication hole on the nozzle flow path side, which penetrates the nozzle flow path and the link compartment, can be formed at a position overlapping with the concentric circle, or can be formed on the inner side in the radial direction of the concentric circle such that the pressure in the link compartment can be further efficiently reduced.

4) The variable geometry turbine (2) according to still another aspect is the variable geometry turbine (2) according to 1) to 3), in which the opening (70A) of the at least one communication hole (70) on the nozzle flow path (25) side and an opening (70B) of the at least one communication hole on a link compartment (28) side are formed such that positions thereof in the radial direction are different from each other.

According to such a configuration, it is not necessary to make the opening of the communication hole on the nozzle flow path side and the opening of the communication hole on the link compartment side coincide with each other in the radial direction. Therefore, it is possible to increase the degree of freedom in the layout for providing the opening of the communication hole on the link compartment side in the link compartment having a limited space.

5) The variable geometry turbine (2) according to still another aspect is the variable geometry turbine (2) according to 4), in which the opening (70A) of the at least one communication hole (70) on the nozzle flow path (25) side is formed on the inner side in the radial direction with respect to the opening (70B) of the at least one communication hole (70) on the link compartment (28) side.

According to such a configuration, the opening of the communication hole on the link compartment side can be formed at any position in the radial direction, and the opening on the nozzle flow path side can be formed on the inner side in the radial direction. The pressure of the nozzle flow path becomes lower toward the inner side in the radial direction. Therefore, by forming the opening on the nozzle flow path side on the further inner side in the radial direction, the pressure in the link compartment can be further efficiently reduced.

6) The variable geometry turbine (2) according to still another aspect is the variable geometry turbine (2) according to 1) to 5), in which the opening (70A) of the at least one communication hole (70) on the nozzle flow path (25) side is formed not to overlap with each of the plurality of nozzle vanes (27) even in a case where each of the plurality of nozzle vanes (27) is in any opening degree state from a fully open state to a fully closed state.

According to such a configuration, the nozzle vane does not block the communication hole through which the nozzle flow path and the link compartment communicate with each other in a case where the nozzle vane is in any opening degree state from the fully open state to the fully closed state. Therefore, the communication hole can always maintain a state in which the nozzle flow path and the link compartment communicate with each other. In addition, since the nozzle vane does not block a part of the communication hole, the communication hole can always maintain the opening even while the variable geometry turbine is operated. Therefore, the pressure in the link compartment can be reduced.

7) The variable geometry turbine (2) according to still another aspect is the variable geometry turbine (2) according to 1) to 6), in which the hub-side member (40) is formed by a nozzle mount (44) of an annular member supported by the housing (23).

According to such a configuration, since the communication hole may be formed in the nozzle mount which is an annular member, it is possible to reduce manufacturing costs as compared with forming the communication hole in the bearing housing or the turbine housing having a complicated shape.

8) A turbocharger (1) according to one aspect includes:
the variable geometry turbine (2) according to any one of 1) to 7); and
a compressor (3) driven by the variable geometry turbine (2).

According to such a configuration, in the turbocharger including the compressor driven by the variable geometry turbine, it is possible to obtain the effect described in any one of 1) to 7).

REFERENCE SIGNS LIST

1: turbocharger
2: variable geometry turbine
3: compressor
5: rotary shaft
21: turbine impeller
21A: hub
21B: rotor blade
22: turbine housing
23: housing
23A: scroll inner wall portion
24: bearing housing
25: nozzle flow path
26: scroll flow path
27: (271 to 279) nozzle vane
27a: leading edge
27b: trailing edge
28: link compartment
29: shroud-side member
29A, 33A: shroud side surface
30: nozzle shaft
30L: axis line (of nozzle shaft)
33: nozzle plate
40: hub-side member
40A, 44A: hub-side surface
40B, 44B: other surface
41: through-hole
44: nozzle mount
50: outlet-side flow path
60: link mechanism
61: lever plate
62: drive ring
70: communication hole
70A: opening on nozzle flow path side
70B: opening on link compartment side
70a: opening portion closest to inner side in radial direction
80: tongue portion
90: concentric circle
100: engine
101: piston
B: movable region
L: axis line

The invention claimed is:

1. A variable geometry turbine comprising:
a turbine impeller;
a housing that accommodates the turbine impeller;
a plurality of nozzle vanes that are disposed in a nozzle flow path formed inside the housing; and
a link mechanism that changes a vane angle of each of the plurality of nozzle vanes by rotating each of the plurality of nozzle vanes,
wherein a link compartment that accommodates the link mechanism and that is partitioned from the nozzle flow path by a hub-side member having a hub-side surface defining the nozzle flow path is formed inside the housing,
the link mechanism and each of the plurality of nozzle vanes are connected to each other through a nozzle shaft penetrating the hub-side member,
at least one communication hole through which the nozzle flow path and the link compartment communicate with each other is formed in the hub-side member, and
an opening of the at least one communication hole on a nozzle flow path side is formed on an inner side in a radial direction of the turbine impeller with respect to a leading edge of each of the plurality of nozzle vanes in a case where each of the plurality of nozzle vanes is in a fully open state, and
wherein the opening of the at least one communication hole on the nozzle flow path side is formed on the inner side in the radial direction with respect to each of a plurality of the nozzle shafts.

2. The variable geometry turbine according to claim 1, wherein the opening of the at least one communication hole on the nozzle flow path side and an opening of the at least one communication hole on a link compartment side are formed such that positions thereof in the radial direction are different from each other.

3. The variable geometry turbine according to claim 2, wherein the opening of the at least one communication hole on the nozzle flow path side is formed on the inner side in the radial direction with respect to the opening of the at least one communication hole on the link compartment side.

4. The variable geometry turbine according to claim 1, wherein the hub-side member is formed by a nozzle mount of an annular member supported by the housing.

5. A turbocharger comprising:
the variable geometry turbine according to claim 1; and
a compressor driven by the variable geometry turbine.

6. A variable geometry turbine comprising:
a turbine impeller;
a housing that accommodates the turbine impeller;
a plurality of nozzle vanes that are disposed in a nozzle flow path formed inside the housing; and
a link mechanism that changes a vane angle of each of the plurality of nozzle vanes by rotating each of the plurality of nozzle vanes,
wherein a link compartment that accommodates the link mechanism and that is partitioned from the nozzle flow path by a hub-side member having a hub-side surface defining the nozzle flow path is formed inside the housing, the link mechanism and each of the plurality of nozzle vanes are connected to each other through a nozzle shaft penetrating the hub-side member, at least one communication hole through which the nozzle flow path and the link compartment communicate with each other is formed in the hub-side member, and an opening of the at least one communication hole on a nozzle flow path side is formed on an inner side in a radial direction of the turbine impeller with respect to a leading edge of each of the plurality of nozzle vanes in a case where each of the plurality of nozzle vanes is in a fully open state, and wherein, in a case where each of the plurality of nozzle vanes is in the fully open state, the opening of the at least one communication hole on the nozzle flow path side is formed at a position overlapping with a concentric circle passing through a trailing edge of each of the plurality of nozzle vanes, or is formed on the inner side in the radial direction with respect to the concentric circle.

7. The variable geometry turbine according to claim 6, wherein the opening of the at least one communication hole on the nozzle flow path side and an opening of the at least one communication hole on a link compartment side are formed such that positions thereof in the radial direction are different from each other.

8. The variable geometry turbine according to claim 7, wherein the opening of the at least one communication hole on the nozzle flow path side is formed on the inner side in the radial direction with respect to the opening of the at least one communication hole on the link compartment side.

9. The variable geometry turbine according to claim 6, wherein the hub-side member is formed by a nozzle mount of an annular member supported by the housing.

10. A turbocharger comprising:
the variable geometry turbine according to claim 6; and
a compressor driven by the variable geometry turbine.

11. A variable geometry turbine comprising:
a turbine impeller;
a housing that accommodates the turbine impeller;
a plurality of nozzle vanes that are disposed in a nozzle flow path formed inside the housing; and
a link mechanism that changes a vane angle of each of the plurality of nozzle vanes by rotating each of the plurality of nozzle vanes, wherein a link compartment that accommodates the link mechanism and that is partitioned from the nozzle flow path by a hub-side member having a hub-side surface defining the nozzle flow path is formed inside the housing, the link mechanism and each of the plurality of nozzle vanes are connected to each other through a nozzle shaft penetrating the hub-side member, at least one communication hole through which the nozzle flow path and the link compartment communicate with each other is formed in the hub-side member, and an opening of the at least one communication hole on a nozzle flow path side is formed on an inner side in a radial direction of the turbine impeller with respect to a leading edge of each of the plurality of nozzle vanes in a case where each of the plurality of nozzle vanes is in a fully open state, and wherein the opening of the at least one communication hole on the nozzle flow path side is formed not to overlap with each of the plurality of nozzle vanes even in a case where each of the plurality of nozzle vanes is in any opening degree state from a fully open state to a fully closed state.

12. The variable geometry turbine according to claim 11, wherein the opening of the at least one communication hole on the nozzle flow path side and an opening of the at least one communication hole on a link compartment side are formed such that positions thereof in the radial direction are different from each other.

13. The variable geometry turbine according to claim 12, wherein the opening of the at least one communication hole on the nozzle flow path side is formed on the inner side in the radial direction with respect to the opening of the at least one communication hole on the link compartment side.

14. The variable geometry turbine according to claim 11, wherein the hub-side member is formed by a nozzle mount of an annular member supported by the housing.

15. A turbocharger comprising:
the variable geometry turbine according to claim 11; and
a compressor driven by the variable geometry turbine.

* * * * *